UNITED STATES PATENT OFFICE.

WILLIAM BATTY AND JOHN ROWE, OF PHILADELPHIA, PENNSYLVANIA.

UTILIZING TIN-SCRAP.

SPECIFICATION forming part of Letters Patent No. 248,390, dated October 18, 1881.

Application filed August 26, 1880. (Specimens.)

*To all whom it may concern:*

Be it known that we, WILLIAM BATTY and JOHN ROWE, citizens of the United States, residing in Philadelphia, Pennsylvania, have invented certain Improvements in Utilizing Tin-Scrap, &c., of which the following is a specification.

The object of our invention is to so treat tin or galvanized iron scrap or waste that the coating of tin or zinc will be recovered and the wrought-iron forming the base of the scrap or waste will be melted and will undergo such a change in character as to produce a metal possessing valuable properties of both iron and steel, and which can be readily cast in suitable molds.

In carrying out our invention we use an ordinary cupola-furnace, and in charging the same we first introduce into the bottom of the furnace a bed of gas-carbon—that is, the hard deposit formed on the inside of gas-retorts by the distillation or decomposition of the coal on the first introduction of the latter into the red-hot retort. This bed extends to a distance of ten or twelve inches above the tuyeres, and on the bed thus formed we charge the tin or iron scrap or waste with a fuel consisting of still-coke, resulting from the distillation of gas-tar or crude petroleum. This still-coke is a cheap fuel which burns without ash and produces the intense heat necessary to effect the melting of the scrap or waste. Still-coke, moreover, is very rich in carbon, and as the melting progresses the iron which formed the base of the said scrap or waste takes up carbon from the coke, so that the molten product of the cupola is a metal differing in some respects from either cast-iron or steel, but possessing valuable properties of both, and to which we have given the name of "semi-steel."

By the use of the bed of gas-carbon, in connection with the still-coke as a charging fuel, we are enabled to avail ourselves of the valuable properties of the latter without incurring the risk of choking the tuyeres, which is an objection to the use of still-coke alone in the furnace, whereas the gas-carbon forms a porous bed through which the blast finds its way to all parts of the mass above the bed.

The tin or zinc coating of the waste or scrap unites with the oxygen of the blast and passes off with the products of combustion, to be afterward separated or recovered in any suitable manner.

We claim as our invention—

As an improvement in treating tin or galvanized iron scrap or waste, the mode herein described, said mode consisting in providing the furnace with a bed of gas-carbon extending to a point above the tuyeres, and then charging the furnace, on top of this bed, with the waste or scrap and still-coke, as set forth.

WILLIAM BATTY.
JOHN ROWE.

Witnesses:
R. S. PARSELS,
A. P. LATCH.